United States Patent
Ohtani

(10) Patent No.: US 8,832,248 B2
(45) Date of Patent: Sep. 9, 2014

(54) PROXY DEVICE FOR MANAGING POWER SUPPLY FOR SERVER UNIT

(75) Inventor: Takeshi Ohtani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 682 days.

(21) Appl. No.: 12/608,192

(22) Filed: Oct. 29, 2009

(65) Prior Publication Data
US 2010/0125742 A1 May 20, 2010

(30) Foreign Application Priority Data

Nov. 19, 2008 (JP) ................... 2008-295948

(51) Int. Cl.
*G06F 15/173* (2006.01)
*G06F 1/32* (2006.01)

(52) U.S. Cl.
CPC ............ *G06F 1/3209* (2013.01); *G06F 1/3203* (2013.01); *G06F 1/3246* (2013.01)
USPC .......................................... 709/223; 709/238

(58) Field of Classification Search
CPC .... G06F 1/3203; G06F 1/3209; G06F 1/3246
USPC .................. 709/221, 223, 224, 225, 228, 238
See application file for complete search history.

(56) References Cited

U.S. PATENT DOCUMENTS

| 7,809,386 | B2* | 10/2010 | Stirbu | 455/503 |
| 2005/0044430 | A1* | 2/2005 | Cheshire | 713/300 |
| 2006/0265473 | A1* | 11/2006 | Muto | 709/218 |
| 2008/0144573 | A1* | 6/2008 | Sairanen | 370/331 |
| 2009/0274102 | A1* | 11/2009 | O'Neill | 370/328 |

FOREIGN PATENT DOCUMENTS

| JP | 5-175964 | 7/1993 |
| JP | 2000-165419 | 6/2000 |
| JP | 2004-334793 | 11/2004 |

* cited by examiner

*Primary Examiner* — Brian J Gillis
(74) *Attorney, Agent, or Firm* — Katten Muchin Rosenman LLP

(57) ABSTRACT

A proxy device has: an address management portion for sending an alternative IP address and an alternative MAC address not used within a network to a server unit when a sleep invocation notification is received from the server unit; a virtual interface creation portion for creating a virtual interface having a server IP address and a server MAC address, which were used by the server unit before the notification is sent; a broadcasting portion for broadcasting a packet indicating that a location of the server IP address and the server MAC address has shifted into the proxy device to the network; a server wakeup processing portion sending a restoration notice to the server unit if the virtual interface receives data destined for the server IP address; and a virtual interface deleting portion for deleting the virtual interface if the server unit indicates restoration from the sleep mode.

7 Claims, 10 Drawing Sheets

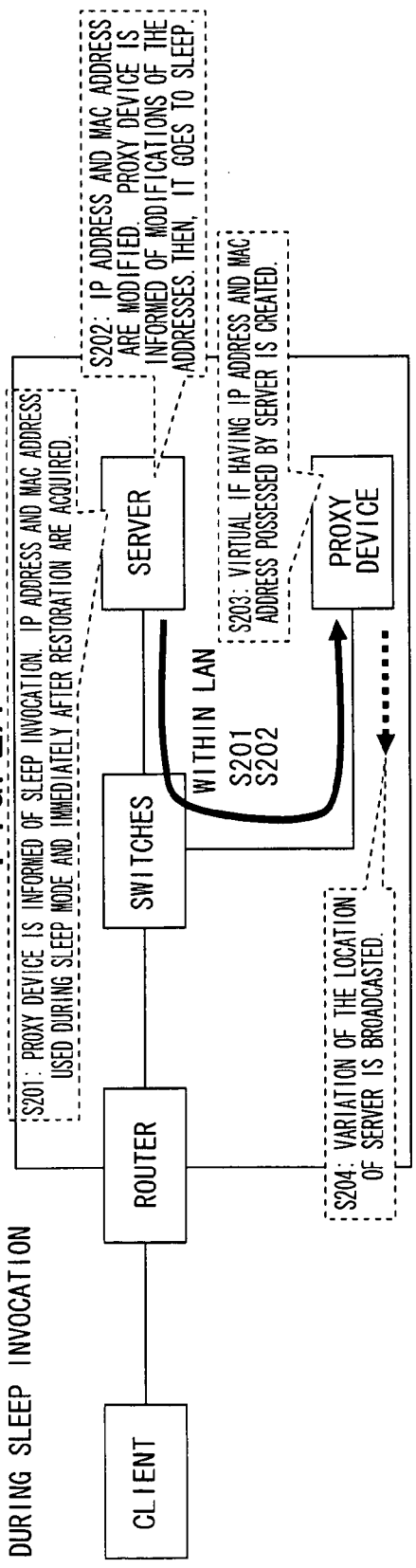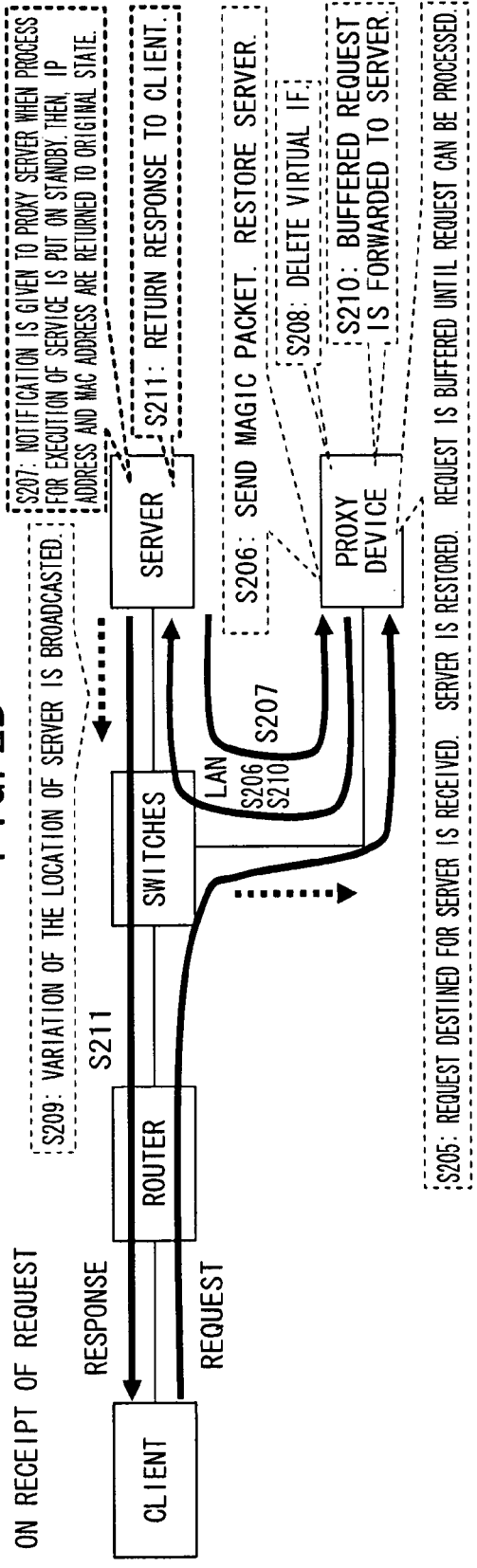

FIG. 6A

| IP ADDRESS | MAC ADDRESS | DELIVERED IP ADDRESS | DELIVERED MAC ADDRESS |
|---|---|---|---|
| xx.xx.xx.xx | aa-aa-aa-aa-aa-aa | zz.zz.zz.zz | bb-bb-bb-bb-bb-bb |
| yy.yy.yy.yy | cc-cc-cc-cc-cc-cc | ww.ww.ww.ww | dd-dd-dd-dd-dd-dd |
| ~ | ~ | ~ | ~ |

SERVER ADDRESS MANAGEMENT TABLE

FIG. 6B

| VIRTUAL IF ID | IP ADDRESS |
|---|---|
| vif#01 | xx.xx.xx.xx |
| ~ | ~ |

VIRTUAL IF MANAGEMENT TABLE

FIG. 6C

| IP ADDRESS | STATUS |
|---|---|
| xx.xx.xx.xx | sleep |
| yy.yy.yy.yy | waking |
| ~ | ~ |

SERVER STATUS MANAGEMENT TABLE

FIG. 7A

```
cd /etc/sysconfig/network-scripts cp ifcfg-eth0 ifcfg-eth0:1 vi ./ifcfg-eth0:1
─────────────────────────
DEVICE=eth0:1
ONBOOT=yes
IPADDR=***.***.***.***
NETMASK=***.***.***.***
NETWORK=***.***.***.***
GATEWAY=***.***.***.***
BOOTPROTO=none
USERCTL=no
───────────────────────── ifup eth0:1
```

- ID OF VIRTUAL IF IS SET TO "eth0:1".
- EDIT CONFIGURATION FILE.
- THIS PORTION IS MODIFIED ACCORDING TO VIRTUAL IF TO BE CREATED. IN THIS CASE, "IPADDR" SUFFICES.
- VIRTUAL IF IS MADE VALID.

INDICATES PROMPT.

FIG. 7B

```
int fd;
struct ifreq ifr;

fd = socket(AF_INET, SOCK_DGRAM, 0);

ifr.ifr_hwaddr.sa_family = ARPHRD_ETHER;

ifr.ifr_hwaddr.sa_data[0] = 0xAA;
ifr.ifr_hwaddr.sa_data[1] = 0xBB;
ifr.ifr_hwaddr.sa_data[2] = 0xCC;
ifr.ifr_hwaddr.sa_data[3] = 0xDD;
ifr.ifr_hwaddr.sa_data[4] = 0xEE;
ifr.ifr_hwaddr.sa_data[5] = 0xFF;

strncpy(ifr.ifr_name, "eth0:1", IFNAMSIZ-1);

ioctl(fd, SIOCSIFHWADDR, &ifr);

close(fd);
```

- OPEN SOCKET.
- IT IS SPECIFIED AS ETHERNET (MAC) ADDRESS.
- SPECIFY MAC ADDRESS TO BE MODIFIED.
- SPECIFY IF TO BE MODIFIED. IN THIS CASE, MAC ADDRESS OF "eth0:1" IS MODIFIED.
- MODIFICATION IS CARRIED OUT IN PRACTICE.
- CLOSE SOCKET.

FIG. 9

| CLIENT IP ADDRESS | SERVER IP ADDRESS | SERVER PORT | ALLOWED/ DISALLOWED |
|---|---|---|---|
| uu.uu.uu.uu/24 | * | * | DISALLOWED |
| vv.vv.vv.vv/24 | xx.xx.xx.xx | 80, 3389 | ALLOWED |
| ~ | ~ | ~ | ~ |

PROXY DEVICE FOR MANAGING POWER SUPPLY FOR SERVER UNIT

CROSS-REFERENCE TO RELATED APPLICATION

This application is based upon and claims the benefit of priority from the prior Japanese Patent Application No. 2008-295948 filed on Nov. 19, 2008, the entire contents of which are incorporated herein by reference.

BACKGROUND

1. Field

The embodiments discussed herein are relates to a technique for operating a server in power-saving modes.

2. Description of Related Art

In recent years, because of increased awareness of the environmental problems, computers have been recommended to be operated in power saving modes. That is, when computers are idle, they are made to sleep. However, once a server (such as a file server, remote desktop server, Web server, or other computer) is made to sleep, if a request arrives from a client terminal (such as a personal computer that is a user terminal), the server cannot respond.

A first known technique for remotely restoring a server from sleep state via a network makes use of a magic packet. A magic packet is made of a packet consisting of 6 repetitions of 0xFF on an Ethernet frame followed by 16 repetitions of the MAC (Media Access Control) address of the server to be awakened. The magic packet is sent by broadcast. If the packet is received by a sleeping server, it is automatically wakened up and restored to normal operation.

A second conventional technique of automatic wakeup is also known. According to this technique, the NIC (network interface card) or architecture of the server is modified. If a request is received by the server that is asleep, the server is automatically wakened up and restored to normal operation.

A third conventional technique of automatic wakeup is also known. In particular, when a device is searched by a UPnP (Universal Plug and Play) method, a proxy server returns a response to the UPnP in place of a sleeping device. According to the need, the device is restored from the sleeping state.

A fourth conventional technique having the following features is also known. In this technique, a proxy server is installed and monitors packets flowing through a network. If the proxy server finds a request destined for a sleeping personal computer (PC), the server searches sets of responses corresponding to the request destined for the PC, the sets of responses being previously stored inside the server. If a pertinent one is found, the server returns it on behalf of the PC. If there is not any pertinent set, the proxy server restores the PC from its sleeping state. When the PC is restored to normal operation, a request is forwarded to the PC, prompting it to make a response.

However, the aforementioned first conventional technique suffers from less convenience in use in the following respects. MAC addresses do not have any name resolution mechanism unlike the DNS. Therefore, it is necessary for the user to previously know the MAC address of the server. However, generally, the user of a client terminal is not in a position where the user manages a remote server. There is no means for knowing the MAC address of the server. Since a magic packet is sent by broadcast, the magic packet can be employed only by terminals within the same LAN as the server. As a result, the user must gain access to a computer within the LAN of the server and send a magic packet to the server to restore it to normal operation. Then, the user must make an access to the server again. In this way, much labor is necessary.

The aforementioned second conventional technique has the problem that the existing computer hardware (network IF) needs to be modified and hence it is quite costly to introduce the technique to the existing computer environment.

Another conceivable technique involves managing the MAC addresses of servers by means of a router or hub. If a request destined for a server is detected, and if the server is asleep, it is restored to normal operation, and a request is sent to the server. However, in the same way as in the second conventional technique, the firmware or hardware of the router needs to be modified. It is difficult to introduce this technique to the existing computer environment because of cost and implementability considerations.

Application of the aforementioned third conventional technique is restricted to UPnP devices. Therefore, use of UPnP is assumed. Since UPnP is based on multicast communications, it is possible to monitor only UPnP requests from client terminals located within the same LAN as the UPnP devices. Accordingly, remote wakeup that would be normally invoked by a service request used in normal unicast communications cannot be done. Consequently, this technique has the problem that it does not contribute to improvement of convenience of general power saving operation of servers.

Additionally, the aforementioned fourth conventional technique needs no hardware modifications and requires only introduction of a new proxy server and thus presents few cost problems. However, the following problems may arise. All packets must be monitored and matching of packet destinations must be done. This results in poor performance. Many restrictions are imposed on installation of the proxy server and hence this technique is difficult to realize. More specifically, recent LANs are made up of switches. Packets are sent to only the port with which a destination computer is connected. An area permitting monitoring of all packets within the LAN cannot be secured. Even if a target server restored from sleeping state, the request cannot be always processed by the server. In some cases, a request must be resent from a client terminal, because it is unlikely that the proxy server grasps even the status of the process in the server. A case is assumed in which the proxy server forwards the request at the instant when the OS is restored from sleep state and made communicable.

SUMMARY

According to an embodiment, a proxy device has: an address management portion for sending an alternative IP address and an alternative MAC address not used within a network to a server unit when a sleep invocation notification is received from the server unit; a virtual interface creation portion for creating a virtual interface having a server IP address and a server MAC address which were used by the server unit before the notification is sent; a broadcasting portion for broadcasting a packet indicating that a location of the server IP address and the server MAC address has shifted into the proxy device to the network; a server wakeup processing portion sending a restoration notice to the server unit if the virtual interface receives data destined for the server IP address; and a virtual interface deleting portion for deleting the virtual interface if the server unit notices restoration from the sleep mode.

It is to be understood that both the foregoing summary description and the following detailed description are explanatory as to some embodiments of the present invention, and not restrictive of the present invention as claimed.

BRIEF DESCRIPTION OF DRAWINGS

FIGS. 2A and 2B are block diagrams illustrating the operation of the first embodiment;
FIGS. 6A-6C illustrate management tables;
FIGS. 7A and 7B illustrate examples of operations for creating a virtual interface and modifying a MAC address, respectively;
FIG. 9 illustrates a policy management table.

DESCRIPTION OF EXAMPLE EMBODIMENTS

Example embodiments are hereinafter described in detail with reference to the drawings.

In each embodiment described below, when a server goes to sleep mode, a proxy device (such as a normal computer or appliance) creates a virtual interface having the same IP address and MAC address as possessed by the server. On the virtual interface, plural addresses are assigned to a single physical NIC (network interface card) such that the virtual interface behaves as though there were plural network IFs. If a request destined for a server arrives from a client terminal, the proxy device receives the request in place of the server, restores the server to normal operation, forwards the request to the server, and causes the server to directly return a response to the client terminal. Consequently, power saving operation of the server can be achieved without modifying the hardware or impairing the convenience.

First Embodiment

Figure 1:
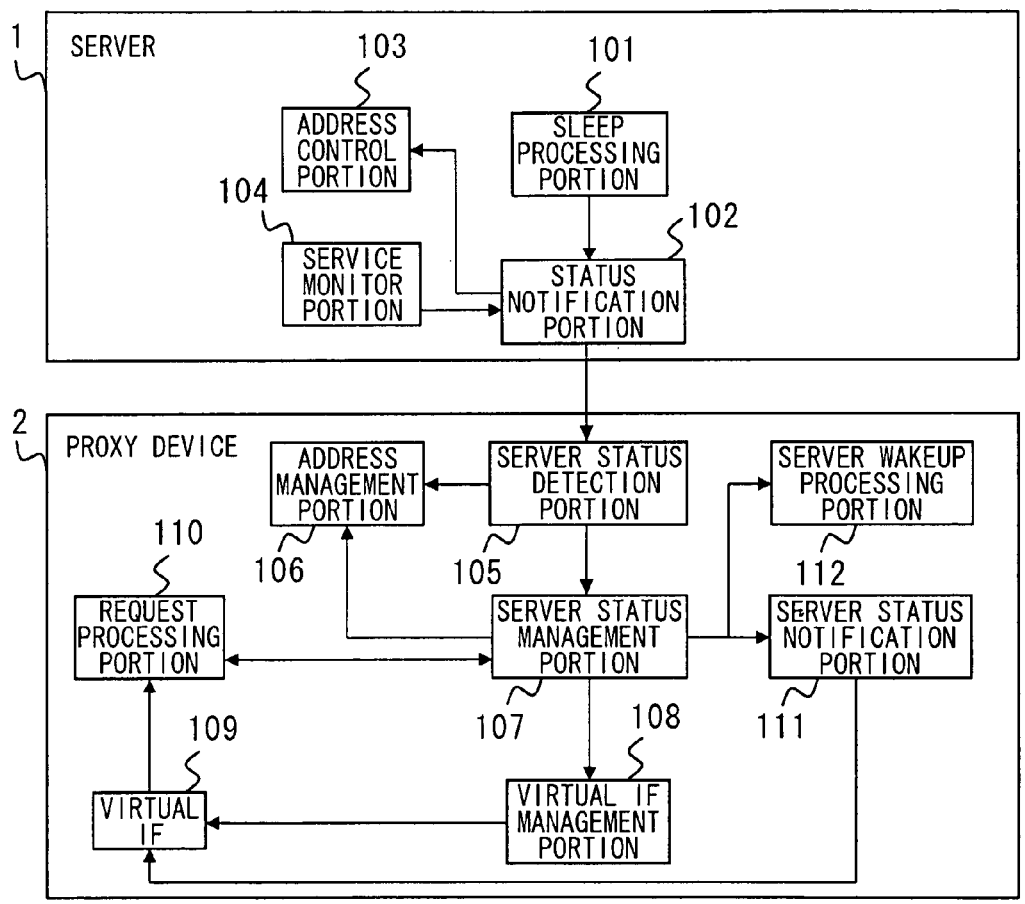
FIG. 1 is a block diagram of a first embodiment.

FIG. 1 is a block diagram of a first embodiment. A server 1 has a sleep processing portion 101, a status notification portion 102, an address control portion 103, and a service monitor portion 104. On the other hand, a proxy device 2 has a server status detection portion 105, an address management portion 106, a server status management portion 107, a virtual interface (IF) management portion 108, a virtual interface (IF) 109, a request processing portion 110, a server status notification portion 111, and a server wakeup processing portion 112.

The configuration of the server 1 is first described. The sleep processing portion 101 detects idle status of the server 1 and places it into sleep mode. The status notification portion 102 sends a sleep invocation notification indicating that the server 1 is going into sleep mode to the proxy device 2.

The address control portion 103 modifies the IP address and MAC address of the server 1 to addresses offered from the proxy device 2 or returns the IP address and MAC address to their original addresses. The service monitor portion 104 monitors the status of the process of a service executed on the server 1.

The configuration of the proxy device 2 is next described. The server status detection portion 105 receives the notification indicating the status from the server 1 and instructs other modules to perform processing corresponding to the status.

The address management portion 106 manages an alternative IP address and an alternative MAC address offered to the server 1. The server status management portion 107 manages the status of each of at least one server 1 under management. Where a request is received, the management portion 107 gives an instruction to each module.

The virtual IF management portion 108 controls generation and disappearance of the virtual interface 109 receiving the request in place of the server 1. The virtual interface 109 is a virtual network interface created by the virtual IF management portion 108.

In response to a request destined for the server 1 and received by the virtual interface 109, the request processing portion 110 refers to the status of the server 1 managed by the server status management portion 107 and buffers the request or forwards the request to the server 1 according to the result of the reference.

The server status notification portion 111 sends broadcast packets to a LAN (local area network) with which the server 1 and proxy device 2 are connected to inform the LAN that the server 1 has entered sleep mode and that the virtual IF 109 acting as a proxy for the server 1 has been created inside the proxy device 2. The server wakeup processing portion 112 sends a request for restoring the server 1 from the sleep mode to the server 1.

The operation of the first embodiment is as follows. FIGS. 2A and 2B are block diagrams illustrating the operation of the first embodiment. Referring to FIGS. 2A and 2B, when the server 1 is put into sleep mode, the sleep processing portion 101 of the server 1 informs the status notification portion 102 that the server is going into sleep mode. The status notification portion 102 sends a sleep invocation notification to the server status detection portion 105 of the proxy device 2 inside the LAN, together with the server's IP address and server's MAC address used by the server 1, to inform the detection portion 105 that the server 1 is put into sleep mode (step S201 of FIG. 2A).

In response to this, the server status detection portion 105 in the proxy device 2 instructs the address management portion 106 to deliver the alternative IP address and alternative MAC address used by the server 1 during sleep mode and immediately after restoration from sleep mode. The server status detection portion 105 sends the addresses to the status notification portion 102 of the server 1 (step S201 of FIG. 2A).

On receiving the notification of the alternative IP address and alternative MAC address from the proxy device 2, the status notification portion 102 of the server 1 instructs the address control portion 103 to modify the IP address and MAC address set in the NIC. The status notification portion 102 informs the server status detection portion 105 of the proxy device 2 that the addresses have been modified, and the sleep processing portion 101 puts the server 1 into sleep mode (step S202 of FIG. 2A).

Both IP address and MAC address are modified to prevent the IP address and MAC address of the virtual interface within the proxy device 2 from overlapping when the server 1 is in sleep mode and immediately after restoration from sleep mode.

The server status detection portion 105 of the proxy device 2 that has received the notification informs the server status management portion 107 that the server 1 is put into sleep mode. The server status management portion 107 updates the status information about the server 1 and instructs the virtual IF management portion 108 to create a virtual interface capable of receiving a request destined for the server. The virtual IF management portion 108 creates the virtual IF 109 having the server IP address and server MAC address originally used by the server 1 (step S203 of FIG. 2A).

The MAC address is brought into coincidence with the MAC address of the server 1 for the following reason. The router might store entries of an address resolution protocol (ARP). In this case, the router attempts to send a request destined for the server 1 to the original MAC address of the server 1 that is already in sleep mode. If the virtual interface has a MAC address different from the MAC address of the server 1, the virtual interface cannot receive requests destined for the server. To prevent this, it is conceivable that the MAC address in an ARP entry in the router could be modified. However, there is not any means for explicitly modifying the ARP entry from outside the router. Therefore, it is difficult to modify the MAC address.

The server status notification portion 111 performs a broadcast by making use of the newly created virtual interface (step S204 of FIG. 2A). In consequence, it is possible to make devices such as switches (SW) within the LAN learn how the location of the server 1 has been modified. When a request is sent to the server 1, the request will arrive at the virtual interface 109 of the proxy device 2.

On the other hand, if a request is sent to the server 1 from a client terminal while the server 1 is in sleep mode, the virtual interface 109 of the proxy device 2 receives the request and passes it to the request processing portion 110. The request processing portion 110 buffers the request and informs the server status management portion 107 that the request destined for the server has arrived (step S205 of FIG. 2B).

The server status management portion 107 refers to the status of the server 1 and if the management portion 107 confirms that the server is in sleep mode, the management portion 107 refers to the alternative MAC address and alternative IP address used when the server 1 is in sleep mode, the addresses being in the address management portion 106. The server status management portion 107 causes the server wakeup processing portion 112 to send a restoration instruction notification for instructing the server 1 to restore from sleep mode (step S206 of FIG. 2B). This notification is provided, for example, by sending a magic packet. In this case, the proxy device 2 is installed within the same LAN as the server 1. Because the proxy device knows the MAC address of the server 1, the problem with the first conventional technique does not occur.

On receiving the notification indicating the restoration from sleep mode from the server wakeup processing portion 112 of the proxy device 2, the server 1 performs a power restoration operation. In this case, the service monitor portion 104 monitors the status of a process that offers a predetermined service and issues a notification indicating the restoration to the status notification portion 102 at the instant when the service becomes executable. The status notification portion 102 gives a restoration completion notification indicating that the server 1 has been returned to normal operation to the server status detection portion 105 of the proxy device 2. The status notification portion 102 instructs the address control portion 103 to return the alternative IP address and alternative MAC address used up to now to the original server IP address and server MAC address (step S207 of FIG. 2B).

On receiving the notification, the server status detection portion 105 of the proxy device 2 informs the server status management portion 107 that the server 1 is on standby. The server status management portion 107 causes the address management portion 106 to free the alternative IP address and alternative MAC address offered to the server 1. Furthermore, the server status management portion 107 instructs the virtual IF management portion 108 to delete the virtual interface for receiving the request in place of the server 1. The virtual IF management portion 108 deletes the virtual interface 109 and updates the virtual interface management table (step S208 of FIG. 2B).

In parallel with these operations, the status notification portion 102 of the server 1 informs the devices inside the LAN that the server 1 has been restored to normal operation by broadcast, if modification of the addresses is complete, such that requests destined for the server again arrive at the server 1 (step S209 of FIG. 2B).

Of course, the broadcasted notification arrives also at the proxy device 2. The notification is received by the server status detection portion 105 and informs the server status management portion 107 of the reception. The server status management portion 107 updates the server status management table and informs the request processing portion 110 that the server 1 has been completely restored and can perform a service. On receiving it, the request processing portion 110, which has buffered requests arrived during the period between when the first request destined for the server was received and when the server 1 was restored, forwards the requests in succession to the server 1 (step S210 of FIG. 2B).

On receiving the requests, the server 1 directly returns a response to the client terminal (step S211 of FIG. 2B).

As described so far, in the first embodiment, when the server 1 sleeps, the virtual interface 109 having the server IP address and server MAC address of the server 1 is created in the proxy device 2. A broadcast is performed at the instant when the server 1 goes into sleep mode. Therefore, it is not necessary to make any modifications to hardware devices such as router, switches, and NIC in the server 1. Furthermore, the proxy device 2 can receive service requests destined for the sleeping server in place of the server 1 wherever the proxy device 2 is placed as long as it is within the LAN where the server 1 is also located.

When the server 1 is asleep, the request processing portion 110 of the proxy device 2 receives a service request destined for the server. The server wakeup processing portion 112 restores the server from sleep mode and forwards the request to the server 1. The server 1 directly returns a response to the client terminal. Furthermore, the service monitor portion 104 makes a decision as to whether the server 1 is in a state where it can execute the service in practice. The status notification portion 102 can inform the proxy device 2 that the server has been restored to the state where it can execute the service in practice. The request processing portion 110 buffers the request until the server 1 is restored to the state where the server can execute the service in practice. The processing portion 110 forwards the request after the restoration. Therefore, the user can gain access by a normal method of employing services, unconscious of whether the server 1 is asleep or not. In addition, it is unlikely that the server 1 cannot fully process the service request; otherwise, it would be necessary for the client terminal to make a request again.

Figure 3:
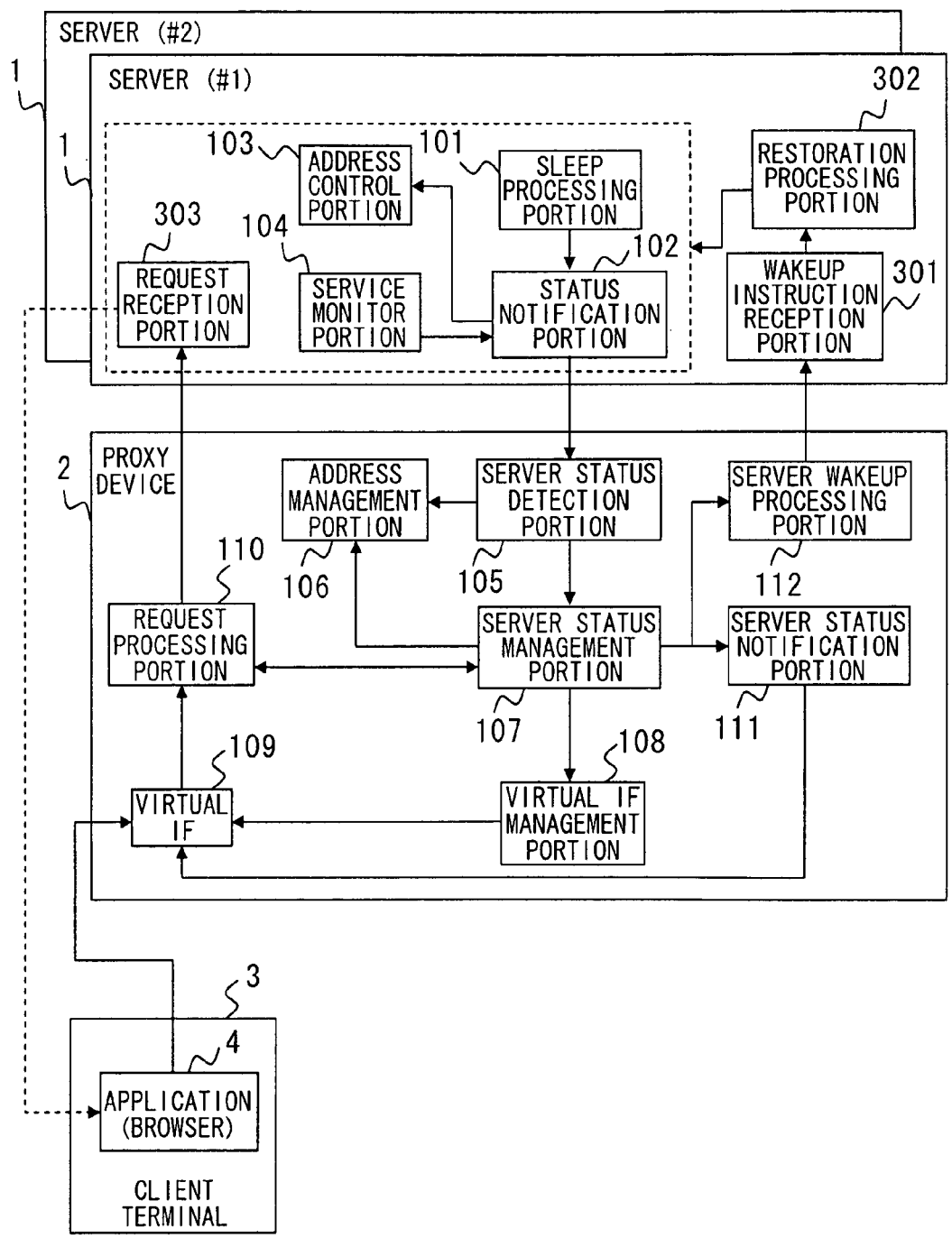
FIG. 3 is a block diagram of a second embodiment.

FIG. 3 is a block diagram of a second embodiment, showing a system for operating the server 1 in power saving mode. It is assumed that the proxy device 2 can control plural servers 1 and is constantly supplied with electric power. Those portions of FIG. 3 which are indicated by the same reference numerals as in FIG. 1 perform the same operations as in FIG. 1.

Figure 4:
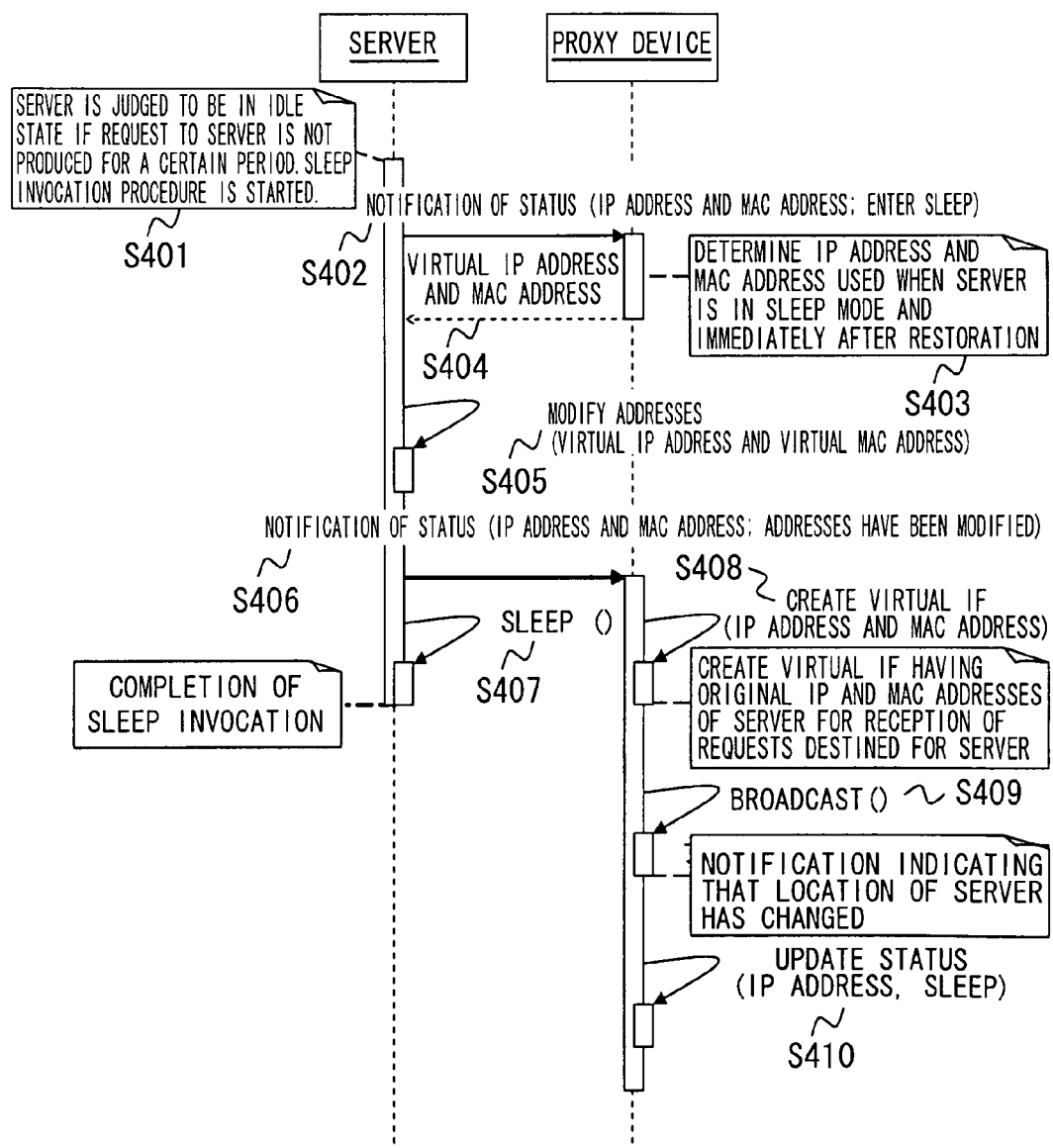
FIG. 4 is a sequence diagram illustrating operation performed when going to sleep mode.
Figure 5:
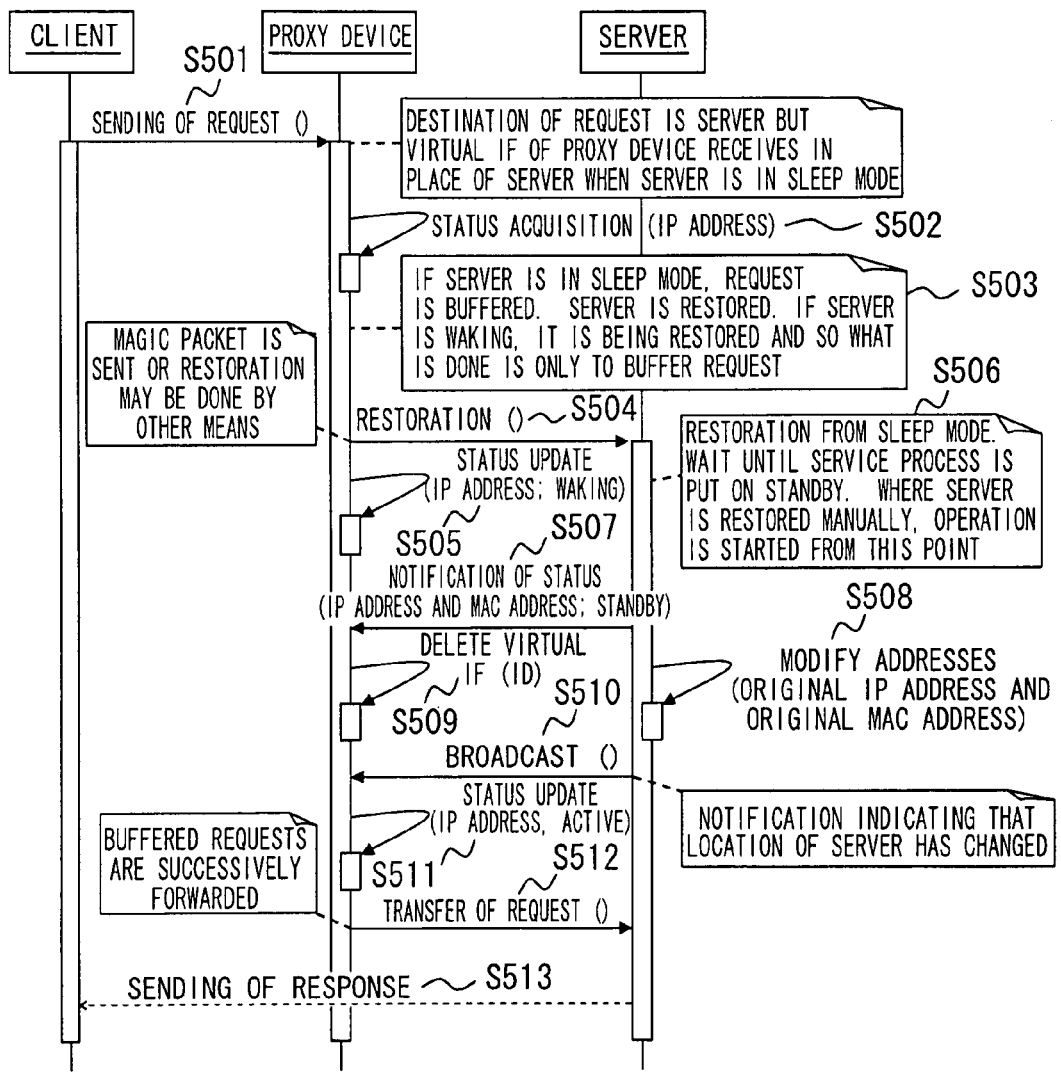
FIG. 5 is a sequence diagram illustrating operation performed on restoration from sleep mode.

The operation of the second embodiment is as follows. FIG. 4 is a sequence diagram illustrating operation performed when going to sleep mode. FIG. 5 is a sequence diagram illustrating operation performed on restoration from sleep mode. FIGS. 6A-6C illustrate management tables. The operation is described below by referring to FIGS. 4-6C.

The operation performed when going to sleep mode is first described by referring to the sequence diagram of FIG. 4. If no request arrives during a certain period of time and no service is executed, the sleep processing portion 101 of the server 1 determines that the server 1 is in idle state (step S401 of FIG. 4). This may be carried out by assuming that the server is deactivated for a predetermined period of time (e.g., outside the business hours or in nighttime hours), causing the sleep processing portion 101 to refer to a clock, and making a decision at a predetermined instant of time as to whether the server is in idle state.

The sleep processing portion 101 informs the status notification portion 102 that the server is going to sleep mode. The status notification portion 102 sends a sleep invocation notification indicating that the server 1 is put into sleep mode to the server status detection portion 105 of the proxy device 2 within the LAN, together with the IP address and MAC address of the server 1 (step S402 of FIG. 4).

In response to this, the server status detection portion 105 causes the address management portion 106 to deliver alternative IP address and alternative MAC address to be used by the server 1 during sleep mode and immediately after restoration from sleep mode (step S403 of FIG. 4). FIG. 6A illustrates an example of server address management table for managing IP address and MAC address of the server 1, the addresses being managed by the address management portion 106. In this table, each item stored in the "IP address" field and "MAC address" field is a server address originally possessed by the server 1. The elements stored in the "delivered IP address" field and "delivered MAC address" field are alternative addresses delivered to the server 1 by the address management portion 106. For the alternative addresses stored in the "delivered IP address" field, some alternative IP addresses that can be used by the proxy device 2 are already secured. If there is a request for delivery of such an alternative address when the server 1 is in sleep mode, one of the secured addresses is delivered such that the delivered one does not overlap the alternative IP addresses delivered to the other servers 1. On the other hand, alternative MAC addresses stored in the "delivered MAC address" field need to be delivered such that they overlap none of the MAC addresses of all the devices used in the LAN. However, in many cases, MAC addresses are not managed, unlike IP addresses, and so an overlap with the MAC addresses of the existing devices presents problems. Accordingly, an alternative MAC address is created by setting an unused vender code (e.g., 00-00-0a), for example, in the initial 3 bits and combining them with the 3 lower significant bits of the IP address. Of course, if the LAN is managing MAC addresses, the LAN can know which MAC addresses are not in use. Therefore, the unused addresses can be assigned as alternative MAC addresses.

The server status detection portion 105 receives the alternative IP address and alternative MAC address to be used when the server 1 is in sleep mode and immediately after restoration from sleep mode from the address management portion 106 and returns the addresses to the status notification portion 102 of the server 1 (step S404 of FIG. 4).

The status notification portion 102 of the server 1 instructs the address control portion 103 to change the server IP address and server MAC address used up to now to the alternative IP address and alternative MAC address delivered from the proxy device 2 (step S405 of FIG. 4). Both IP address and MAC address are changed, so that the IP address and MAC address are prevented from overlapping and conflicting with the IP address and MAC address of the virtual interface 109 inside the proxy device 2 when the server 1 is in sleep mode and immediately after restoration from sleep mode.

If modification of the addresses is complete at the address control portion 103, the status notification portion 102 notifies the server status detection portion 105 of the proxy device 2 that the modification of the addresses is complete (step S406 of FIG. 4).

The sleep processing portion 101 puts the server into sleep mode. The transition to sleep mode is completed (step S407 of FIG. 4). The server status detection portion 105 receiving a notification from the server 1 notifies the server status management portion 107 that the server 1 will go into sleep mode.

In response to this, the server status management portion 107 instructs the virtual IF management portion 108 to create a virtual interface capable of receiving requests destined for the server. The virtual IF management portion 108 creates the virtual interface 109 having the server IP address and server MAC address originally used by the server 1 (step S408 of FIG. 4). The MAC address is also brought into coincidence with the MAC address of the server 1 because the router might store entries of the address resolution protocol (ARP). If such entries are stored, the router attempts to send a request destined for the server 1 and arriving from the outside to a device having the MAC address originally used by the server 1. To prevent this, it is conceivable to modify the ARP entries inside the router. However, routers generally do not offer means for explicitly varying the ARP entries. Therefore, it is necessary to bring the MAC address of the virtual interface 109 into coincidence with that of the server 1. Because plural virtual interfaces can be created within one proxy device 2, the single proxy device 2 can act as a proxy for plural servers 1.

FIG. 6B illustrates an example of configuration of a virtual IF management table managed by the virtual IF management portion 108. The table has a "virtual IF ID" field and an "IP address" field. An ID for identifying a created virtual interface 109 is stored in the virtual IF ID field. A server IP address set in the virtual interface 109 is stored in the IP address field.

FIGS. 7A and 7B illustrate examples in which the virtual interface 109 is created. In FIG. 7A, the virtual interface 109 is assumed to have an ID "eth0:1". For example, a script program (in FIG. 7A, editor vi for the sake of simplicity of illustration) executed by the virtual IF management portion 108 of FIG. 3 edits a configuration file for creation of the virtual interface. Then, a script program (in FIG. 7A, command input for the sake of simplicity of illustration) again executed by the virtual IF management portion 108 activates a command "ifup" that makes active the virtual interface 109. Consequently, the IP address of the virtual interface 109 is modified.

An example of program executed by the virtual IF management portion 108 to modify the MAC address of the virtual interface 109 is shown in FIG. 7B. In this example, the MAC address is modified by making use of an API (application interface) known as ioctl possessed by the operating system in the server 1.

Subsequently, the server status notification portion 111 performs a broadcast by employing the newly created virtual interface 109 (step S409 of FIG. 4). Consequently, it is possible to make devices inside the LAN, such as switches, learn that the location of the server 1 has been modified. Where a request is sent to the server 1, the request will arrive at the virtual interface 109 of the proxy device 2.

Finally, the server status management portion 107 updates the information about the status of the server 1 (step S410 of FIG. 4). FIG. 6C illustrates an example of server status management table of the server 1 possessed by the server status management portion 107. The table has an "IP address" field and a "status" field. The server IP address originally possessed by the server 1 is stored in the "IP address" field. Information indicating the status of the server 1 is stored in "status" field. The content of the information can be indicated by "sleep", "waking", or "active". In the mode of operation indicated by "sleep", the server 1 is in sleep mode. In the mode indicated by "waking", the server 1 is being restored from sleep mode but yet cannot perform any service. In the mode indicated by "active", the server 1 is in operation and can perform a service.

When a status notification is received in step S406 of FIG. 4, the status of the server 1 is varied to "sleep".

Operation performed on restoration from sleep mode is next described by referring to the operation sequence diagram of FIG. 5. When a service request is sent to the server 1 via a network (not shown) (such as the Internet or a LAN) from the client terminal 3 of FIG. 3 while the server 1 is in sleep mode, the virtual interface 109 of the proxy device 2 receives the request (step S501 of FIG. 5). The request is issued, for example, as a homepage browsing instruction from a browser application 4 executed by the client terminal 3. The request is passed to the request processing portion 110 from the virtual interface 109.

The request processing portion 110 buffers the request and informs the server status management portion 107 that a request destined for the server 1 has arrived. The server status management portion 107 acquires the status of the server 1 from the server status management table (see FIG. 6C) (step S502 of FIG. 5).

Where the server 1 is in "sleep" mode, the server status management portion 107 refers to the alternative MAC address and alternative IP address used when the server 1 is in sleep mode through the address management portion 106. The server status management portion 107 restores the server 1 from sleep mode through the server wakeup processing portion 112. On the other hand, when the server 1 is in operation ("active" state), the server status management portion 107 returns a message to this effect to the request processing portion 110. The request processing portion 110 immediately forwards the request to the server 1 without the restoration procedure. Moreover, when the server 1 is in "waking" state, the server status management portion 107 causes the request processing portion 110 to continue the buffering of the request because the server 1 cannot yet perform any service (step S503 of FIG. 5).

The server wakeup processing portion 112 sends a restoration instruction notification indicating restoration from sleep mode to a wakeup instruction reception portion 301 of the server 1 (step S504 of FIG. 5). The method of restoring the server may use a magic packet as used normally. Other method may also be used.

After issuing the restoration instruction to the server wakeup processing portion 112, the server status management portion 107 updates the status of the pertinent server 1 in the server status management table to "waking" (step S505 of FIG. 5).

On receiving the restoration instruction notification from the server wakeup processing portion 112 of the proxy device 2, the wakeup instruction reception portion 301 of the server 1 gives an instruction for restoration from sleep mode to a restoration processing portion 302. The restoration processing portion 302 performs a normal restoration operation and resumes the operations of the sleep processing portion 101, status notification portion 102, address control portion 103, service monitor portion 104, and request reception portion 303. Concurrently, the process for a service is resumed (step S506 of FIG. 5). The service monitor portion 104 is monitoring the status of the process that offers a predetermined service. When the service becomes executable, the service monitor portion 104 informs the status notification portion 102 that the server has been restored. One conceivable method of checking that the service is executable is to refer to the status of the process managed by the OS. Another conceivable method is to access to the service in practice.

The status notification portion 102 of the server 1 issues a restoration completion notification indicating that the server has been restored to the server status detection portion 105 of the proxy device 2, together with the alternative IP address and alternative MAC address used up to now (step S507 of FIG. 5). The status notification portion 102 instructs the address control portion 103 to return the IP address and MAC address to their original addresses.

With respect to the IP address and MAC address of the NIC of the server, the address control portion 103 returns the alternative IP address and alternative MAC address used up to now to the original server IP address and server MAC address (step S508 of FIG. 5).

On receipt of the restoration completion notification from the server 1, the server status detection portion 105 gives a notification to the server status management portion 107. The server status management portion 107 frees the alternative IP address and alternative MAC address offered to the server 1 for the address management portion 106. In particular, the server status management portion 107 searches the server address management table (see FIG. 6A), using a set of the alternative IP address and alternative MAC address received from the server 1 as keywords. The pertinent entries are deleted. Furthermore, the server status management portion 107 instructs the virtual IF management portion 108 to delete the virtual interface 109 corresponding to the server 1. The virtual IF management portion 108 searches the virtual IF management table (see FIG. 6B), using the server IP address as a keyword, the IP address being set in the "IP address" field (see FIG. 6A) of the entries deleted from the server address management table. The virtual IF management portion 108 acquires the ID of the virtual interface 109 from the pertinent entry, deletes the virtual interface 109 having the ID, and deletes the entry from the virtual IF management table (step S509 of FIG. 5).

In parallel with these operations, the server 1 broadcasts a notification indicating that the server 1 has been restored to the devices within the LAN when modification of the addresses is complete, and permits requests destined for the server 1 to arrive at the server 1 again (step S510 of FIG. 5).

Of course, the broadcasted notification arrives also at the proxy device 2. The server status detection portion 105 receives it and gives a notification to the server status management portion 107. The server status management portion 107 updates the status of the pertinent server 1 in the server status management table (see FIG. 6C) to "active" (step S511 of FIG. 5).

At the same time, the server status management portion 107 informs the request processing portion 110 that the server 1 has been completely restored and can perform a service. In response to this, the request processing portion 110 successively forwards requests, which are buffered after receiving the requests during a period between the instant when the first request destined for the server was received and the instant when the server 1 was restored, to the server 1 (step S512 of FIG. 5).

The server 1 receiving the requests returns a response directly to the client terminal 3 (step S513 of FIG. 5).

In the above-described first and second embodiments, it is assumed that if the proxy device 2 receives a service request when the server 1 is in sleep mode, the server is restored unconditionally and the request is forwarded. However, a decision may be made as to whether the server should be restored, based on the attribute of the client terminal, used protocol, or the priority of the service. In this case, it is not necessary to restore the server 1 in response to every unimportant service request. Hence, the efficiency of the power saving operation of the server 1 can be improved.

Figure 8:
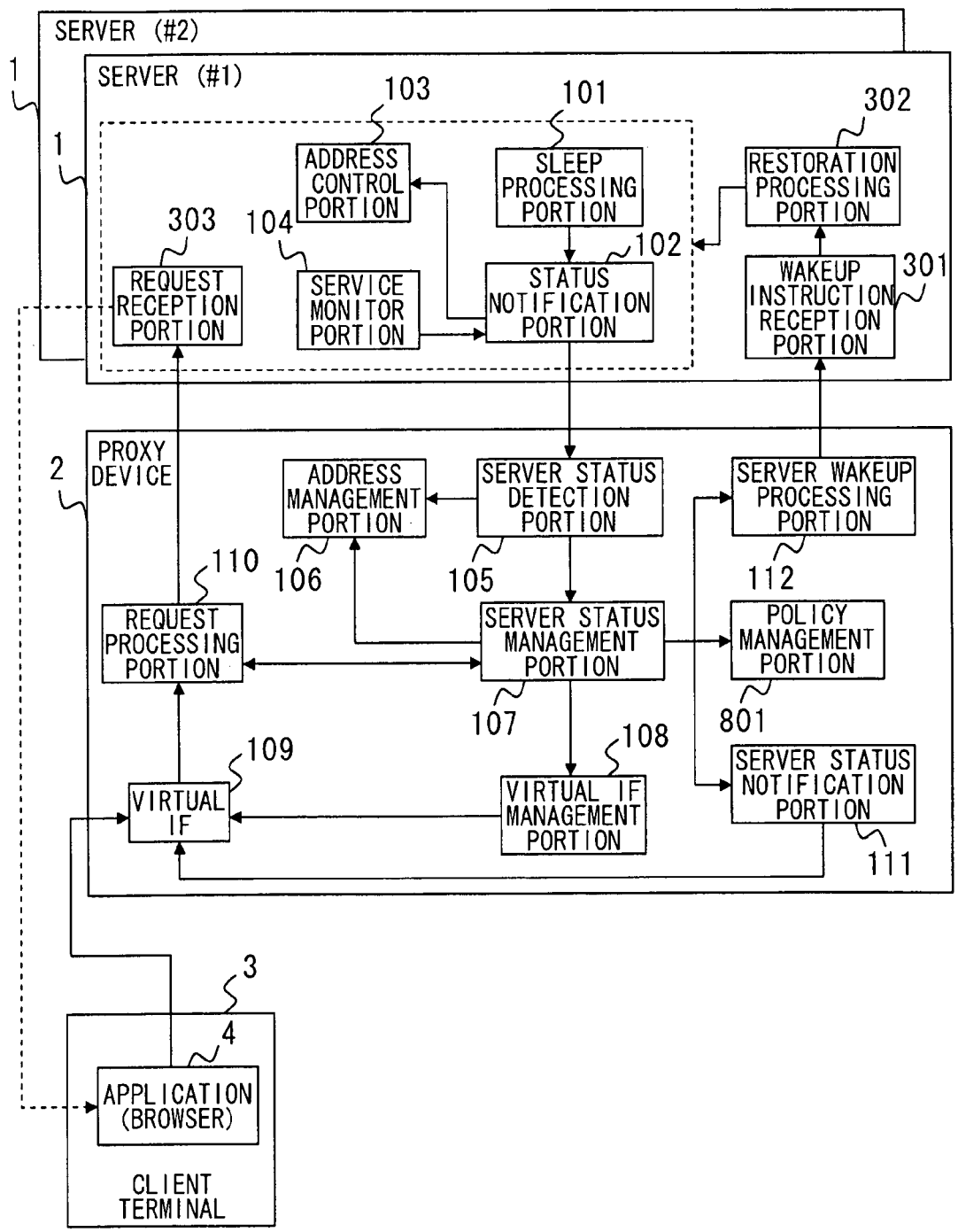
FIG. 8 is a block diagram of a third embodiment.

FIG. 8 is a block diagram of a third embodiment. Those portions of FIG. 8 which are indicated by the same reference numerals as in FIGS. 1 and 3 operate in the same way as in FIGS. 1 and 3 except that the proxy device 2 is provided with a policy management portion 801, unlike in FIGS. 1 and 3. The policy management portion 801 manages a condition (policy) based on which a decision is made as to whether or not the server 1 in sleep mode is restored. Where the management portion receives a request in practice, it makes a decision as to whether the server is restored.

One conceivable policy is to refrain from restoring which servers in response to every service request, for example, from certain domains (all client terminals 3 having IP addresses belonging to uu.uu.uu.uu/24) or to restore the servers in response to a request sent from some domains (all client terminals 3 having IP addresses belonging to vv.vv.vv.vv/24) to a Web server having a port number 80 and to a remote desktop having a port number 3389. In this case, an example of policy management table managed by the policy management portion 801 is shown in FIG. 9.

If a request destined for the server 1 is received by the proxy device 2, the server status management portion 107 makes an inquiry to the policy management portion 801 as to whether the server 1 is restored when the request processing portion 110 informs the server status management portion 107 of the reception of the request.

The policy management portion 801 collates the characteristics (IP address of the sender and the IP address and port number of the destination server 1) of the request with the policies within the policy management table and makes a decision as to whether or not the server 1 is restored.

If a decision made by the policy management portion 801 is that restoration is allowed, the server status management portion 107 performs a normal operation for restoring the server 1. If the decision made by the policy management portion 801 is that restoration is disallowed, the server status management portion 107 instructs the request processing portion 110 to discard the request or return an error message to the client terminal 3.

Because of the configuration described so far, more efficient power saving operation can be performed by operating a server restoration condition as a policy.

Figure 10:
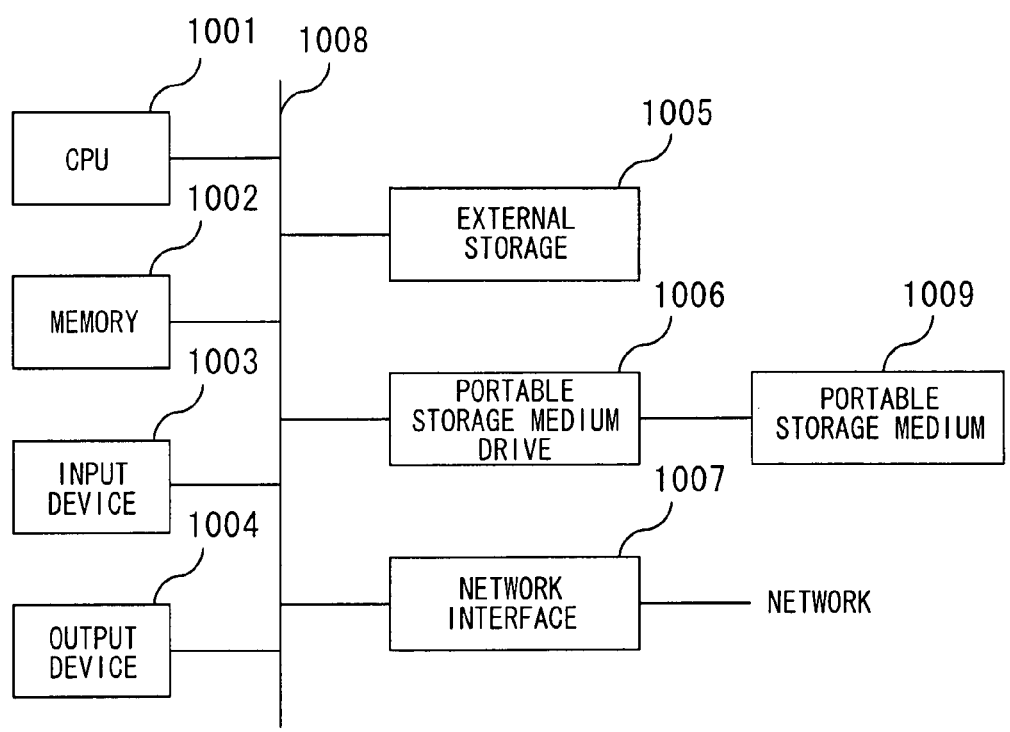
FIG. 10 is a block diagram illustrating the hardware configuration of a computer system capable of executing programs corresponding to embodiments.

FIG. 10 is a block diagram showing one example of hardware configuration of a computer capable of realizing the system of the aforementioned proxy device 2 or server 1.

The computer shown in FIG. 10 has a CPU 1001, a memory 1002, an input device 1003, an output device 1004, an external storage 1005, a portable storage medium drive 1006 into which a portable storage medium 1009 is inserted, and a network interface 1007. These components are interconnected by a bus 1008. The configuration shown in FIG. 10 is one example of computer capable of realizing the system. Such a computer is not restricted to this configuration.

The CPU 1001 controls the whole computer. The memory 1002 is formed of a memory such as a RAM in which a program or data stored in the external storage 1005 or in the portable storage medium 1009 is temporarily stored when the program is executed or data is updated. The CPU 1001 controls the whole computer by reading the program into the memory 1002 and executing the program.

The input device 1003 includes, for example, a keyboard, a mouse, and interfaces for them. The input device 1003 detects a manipulation for user's inputting with the keyboard and mouse. The input device 1003 informs the CPU 1001 of the result of the detection.

The output device 1004 includes a display device, a printer, and interfaces for them. The output device 1004 receives data sent in under control of the CPU 1001 and outputs the data to the display device and printer.

The external storage 1005 is a hard disk storage, for example, and used mainly to preserve various kinds of data and programs.

The portable recording medium drive 1006 accommodates the portable storage medium 1009 such as an optical disk, an SDRAM, or compact flash (trademark) and acts to assist the external storage 1005.

The network interface 1007 is a device for connection, for example, with a telecommunication line such as a LAN (local area network) or a WAN (wide area network).

The system of FIG. 10 is implemented as the proxy device 2 shown in FIG. 1, 3, or 8 by causing the CPU 1001 to execute a program offering functions necessary for various parts of the proxy device 2 shown in FIG. 1, 3, or 8.

The system of FIG. 10 is implemented as the server 1 shown in FIG. 1, 3, or 8 by causing the CPU 1001 to execute a program offering functions necessary for various parts of the server 1 shown in FIG. 1, 3, or 8. Alternatively, any of the various portions of the server 1 and proxy device 2 illustrated in FIG. 1, 3 or 8 may be realized by dedicated hardware devices for performing their respective features.

Such programs may be recorded, for example, on the external storage 1005 or portable storage medium 1009 and distributed. Alternatively, the programs may be acquired from a network through the network interface 1007.

The embodiment described above is a preferred embodiment. The present invention is not limited to this but various modifications can be made without departing from the spirit of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions has been described in detail, it should be understood that the various changes, substitutions, and alterations could be made hereto without departing from the spirit and scope of the invention.

What is claimed is:

1. A proxy device acting to manage a power supply for a computer, the proxy device and the computer being installed within a LAN (local area network), said proxy device comprising:

a processor to execute a process including:

when a sleep invocation notification indicating that the computer is going into a sleep mode is received from the computer, sending a second address not used within the LAN to the computer;

creating a virtual interface having a first address, which are received from the computer together with the sleep invocation notification and which were used by the computer before the notification is sent;

broadcasting a packet to the LAN, the packet indicating that a location of the first address has shifted from the computer into the proxy device;

sending a restoration instruction notification instructing the computer to restore from the sleep mode to the computer, which has switched to using the second address, if the virtual interface receives data destined for the first address; and deleting the virtual interface if a restoration completion notification indicating that the computer has restored from the sleep mode is received from the computer after the sending of the restoration instruction notification.

2. The proxy device as set forth in claim 1, wherein the process further including:

when the virtual interface receives data destined for the first address, buffering the received data until a broadcast packet indicating that the location of the first address has returned into the computer from the proxy device is received; and forwarding the buffered data to the computer after the broadcast packet is received.

3. The proxy device as set forth in claim 1, wherein said process includes sending said restoration instruction notification to the computer in a case where predetermined conditions are met.

4. The proxy device as set forth in claim 1, wherein the process includes broadcasting the packet to a plurality of switches within the LAN.

5. A method of managing a power supply for a computer with which a proxy device is coupled, the proxy device and the computer being installed within a LAN (local area network), said method comprising:

notifying the proxy device of a first address used by the computer from the computer when the computer goes into a sleep mode;

notifying the computer of a second address not used in the LAN from the proxy device in response to the notification from the computer;

creating a virtual interface having the first address;

broadcasting a location of the first address to the LAN;

causing the computer to change to using the second address;

putting the computer into the sleep mode;

causing the proxy device to notify the computer of restoration from the sleep mode when a request destined for the computer is received by the proxy device through the LAN;

permitting the computer to restore from the sleep mode in response to the notification of the restoration;

notifying the proxy device of completion of restoration from the computer;

changing the computer from using the second address back to using the first address;

broadcasting the location of the first address to the LAN; and deleting the virtual interface by the proxy device.

6. A non-transitory, tangible computer-readable storage medium storing a power management program that causes a computer to execute an operation, the operation comprising:

sending a second address not used within a LAN (local area network) to a computer which is installed within the LAN when a sleep invocation notification indicating that the computer is going into a sleep mode is received from the computer;

creating a virtual interface having a first address, which were used by the computer prior to the notification and which are received from the computer together with the sleep invocation notification;

broadcasting a packet to the LAN, wherein the packet indicates that a location of the first address has shifted from the computer to a proxy device which is installed within the LAN;

sending a restoration instruction notification instructing the computer to restore from the sleep mode to the computer, which has switched to using the second address, when the virtual interface receives data destined for the first address, for waking up the computer; and deleting the virtual interface if a restoration completion notification indicating that the computer has recovered from the sleep mode is received from the computer after the sending of the restoration instruction notification.

7. A non-transitory, tangible computer-readable storage medium storing a power management program that causes a processor to execute an operation, the operation comprising:

detecting that a computer whose power supply is managed by a proxy device is in an idle state, the proxy device and the computer being installed within a LAN (local area network);

sending a sleep invocation notification indicating that the computer is going into a sleep mode to the proxy device together with a first address used by the computer;

receiving a second address from the proxy device;

changing the computer from using the first address to using the second address;

putting the computer into the sleep mode after the changing operation;

restoring the computer from the sleep mode if a restoration instruction notification indicating restoration of the computer from the sleep mode is received from the proxy device;

sending a restoration completion notification indicating that the computer has restored from the sleep mode to the proxy device after completion of the restoration from sleep mode;

changing the computer from using the second address back to using the first address after completion of the restoration from the sleep mode; and broadcasting a packet, which indicates that a location of the first address has returned to the computer from the proxy device, to the LAN.

* * * * *